(12) United States Patent
Iorio et al.

(10) Patent No.: US 10,065,373 B2
(45) Date of Patent: Sep. 4, 2018

(54) MULTI-MATERIAL THREE DIMENSIONAL MODELS

(71) Applicant: Autodesk, Inc., San Rafael, CA (US)

(72) Inventors: Francesco Iorio, Toronto (CA); Nigel Jed Wesley Morris, Toronto (CA); Adrian Adam Thomas Butscher, Toronto (CA); Massimiliano Moruzzi, Rockford, IL (US)

(73) Assignee: Autodesk, Inc., San Rafael, CA (US)

( * ) Notice: Subject to any disclaimer, the term of this patent is extended or adjusted under 35 U.S.C. 154(b) by 392 days.

(21) Appl. No.: 14/869,847

(22) Filed: Sep. 29, 2015

(65) Prior Publication Data
US 2016/0101570 A1    Apr. 14, 2016

Related U.S. Application Data

(60) Provisional application No. 62/062,025, filed on Oct. 9, 2014.

(51) Int. Cl.
*B29C 67/00*  (2017.01)
*G05B 19/4099*  (2006.01)
(Continued)

(52) U.S. Cl.
CPC ........ *B29C 67/0088* (2013.01); *B29C 64/386* (2017.08); *B29C 64/393* (2017.08);
(Continued)

(58) Field of Classification Search
CPC ..... B29C 64/386; B29C 64/393; B33Y 50/02; G05B 19/4099; G05B 19/49007; G05B 2219/35134
See application file for complete search history.

(56) References Cited

U.S. PATENT DOCUMENTS

| | | | |
|---|---|---|---|
| 6,940,037 B1* | 9/2005 | Kovacevic | B23K 9/044 219/121.45 |
| 2002/0167101 A1* | 11/2002 | Tochimoto | B29C 41/36 264/40.1 |

(Continued)

OTHER PUBLICATIONS

Kämpe, V. et al. *High Resolution Sparse Voxel DAGs*. ACM Transactions on Graphics. ACM. vol. 34, Issue 4. Published Jul. 2013. 8 pages.

(Continued)

*Primary Examiner* — Allan R Wilson
(74) *Attorney, Agent, or Firm* — Fish & Richardson P.C.

(57) ABSTRACT

Methods, systems, and apparatus, including medium-encoded computer program products, facilitate creation and use of multi-material three dimensional models. In one aspect, a system includes one or more computer storage media having instructions stored thereon; and one or more data processing apparatus configured to execute the instructions to perform operations including (i) receiving input specifying different material properties of an object to be manufactured, (ii) generating from the input a three dimensional (3D) model of the object using overlapping volume representations of the different material properties of the object, wherein the overlapping volume representations employ different data formats and different resolutions, and (iii) storing the 3D model of the object for use in manufacturing the object.

23 Claims, 5 Drawing Sheets

(51) Int. Cl.
B29C 64/393 (2017.01)
B29C 64/386 (2017.01)
B33Y 50/02 (2015.01)

(52) U.S. Cl.
CPC .......... G05B 19/4099 (2013.01); B33Y 50/02 (2014.12); *G05B 2219/35134* (2013.01); *G05B 2219/49007* (2013.01)

(56) References Cited

U.S. PATENT DOCUMENTS

| | | | |
|---|---|---|---|
| 2003/0207959 A1* | 11/2003 | Napadensky | B29C 67/0059 522/183 |
| 2011/0228055 A1* | 9/2011 | Sharp | G06T 15/06 348/51 |
| 2014/0070461 A1* | 3/2014 | Pax | B29C 67/0055 264/401 |
| 2015/0165683 A1* | 6/2015 | Cheverton | B29C 67/0088 382/141 |
| 2016/0067927 A1* | 3/2016 | Voris | B29C 67/0088 700/98 |
| 2016/0096318 A1* | 4/2016 | Bickel et al. | B29C 67/0051 264/40.1 |
| 2016/0101568 A1* | 4/2016 | Mizes | B33Y 10/00 264/40.1 |
| 2016/0279880 A1* | 9/2016 | Zeng | B29C 67/00 |
| 2017/0021565 A1* | 1/2017 | Deaville | B29C 70/382 |

OTHER PUBLICATIONS

*Level set (data structures)*. Wikipedia, the free encyclopedia. Last modified Aug. 19, 2014. Retrieved on Sep. 16, 2014. Retrieved from the internet: URL <http://en.wikipedia.org/wiki/Level_set (data structures)>. 4 pages.

*Constructive solid geometry*. Wikipedia, the free encyclopedia. Last modified Sep. 13, 2014. Retrieved on Sep. 16, 2014. Retrieved from the internet: URL <http://en.wikipedia.org/wiki/Constructive_solid_geometry>. 3 pages.

Kase, K. et al. *Volume CAD*. Proceedings of the 2003 Eurographics/IEEE TVCG Workshop on Volume graphics. Jul. 2003. 7 pages.

*3D modeling*. Wikipedia, the free encyclopedia. Last modified Aug. 13, 2014. Retrieved on Aug. 14, 2014. Retrieved from the internet: URL <http://en.wikipedia.org/wiki/3D_modeling>. 7 pages.

Farin, Gerald. *From Conics to NURBS: A Tutorial and Survey*. Computer Graphics and Applications, IEEE. vol. 12, Issue 5. Published Sep. 1992. 9 pages.

Nielsen, M. et al. *Dynamic Tubular Grid: An Efficient Data Structure and Algorithms for High Resolution Level Sets*. Journal of Scientific Computing, vol. 26, No. 3. Published online Jan. 6, 2006. 40 pages.

Whitaker, Ross T. *A Level-Set Approach to 3D Reconstruction From Range Data*. The International Journal of Computer Vision. vol. 29, No. 3. Oct. 1998. 33 pages.

Hardy, Rolland L. *Multiquadric Equations of Topography and Other Irregular Surfaces*. Journal of Geophysical Research. vol. 76, Issue 8. Published Mar. 10, 1971. 11 pages.

Sethian, J.A. *Level Set Methods: Evolving Interfaces in Geometry, Fluid Mechanics, Computer Vision, and Materials Science*. Cambridge: Cambridge University Press, 1996. 8 pages.

Fuchs, H. et al. *Optimal surface reconstruction from planar contours*. Communications of the ACM, vol. 20, No. 10. Published Oct. 1977. pp. 693-702.

Sungurof, A. et al. *Computer generated images for medical applications*. SIGGRAPH '78 Proceedings of the 5th annual conference on Computer graphics and interactive techniques. Published Aug. 1978. pp. 196-202.

*Interpolation*. Wikipedia, the free encyclopedia. Retrieved on Sep. 17, 2015. Retrieved from the internet: URL <https://en.wikipedia.org/wiki/Interpolation>. 6 pages.

* cited by examiner

MULTI-MATERIAL THREE DIMENSIONAL MODELS

CROSS-REFERENCE TO RELATED APPLICATIONS

This application claims the benefit under 35 U.S.C. § 119(e) of U.S. Patent Application No. 62/062,025, entitled "MULTI-MATERIAL THREE DIMENSIONAL MODELS", filed Oct. 9, 2014, which is hereby incorporated by reference.

BACKGROUND

This specification relates to three dimensional (3D) modeling programs, such as computer-aided design (CAD) applications used with 3D printing.

CAD software has been developed and used to generate two dimensional (2D) and 3D representations of objects. Such 3D representations of objects have employed various modeling techniques to represent the 3D object. In general, 3D models can be divided into two categories: (1) solid models that represent volumes of the object, and (2) shell models that represent the boundaries between solid and non-solid parts of the 3D object. Traditionally, CAD software has focused on surface only representations, e.g., boundary representation (BREP), which are techniques that use various forms of surface discretization, such as polygonal meshes, parametric volumes or surfaces, such as non-uniform rational B-splines (NURBs), subdivision surfaces, etc. Volumetric representations have included voxel structures for the purpose of describing inherently volumetric objects, such as human body parts as scanned by Magnetic Resonance Imaging (MRI) and Computerized Axial Tomography (CAT) machines.

SUMMARY

This specification describes technologies relating to the creation and use of multi-material three dimensional (3D) models. A flexible 3D data structure is described that can subsume and manipulate several spatially collocated representations of an object being modeled. This data structure can facilitate the manufacture of the object to have different material properties at different locations. For example, the data structure can be used with additive manufacturing systems (e.g., 3D printers) that use different materials as inputs, generate different output materials in the object being manufactured, or both.

In general, one or more aspects of the subject matter described in this specification can be embodied in one or more methods that include receiving input specifying different data format representations for respective different material properties of an object to be manufactured (e.g., an object to be built using an additive manufacturing system); generating a 3D model of the object within a 3D space using the different data format representations to store values for the different material properties that overlap in the 3D space; and storing the 3D model of the object for use in manufacturing the object (e.g., using a 3D printer to print the object using different materials). Other embodiments of this aspect include corresponding systems, apparatus, and computer program products, such as a computer storage medium having instructions stored thereon that cause data processing apparatus to perform operations of the method(s).

Receiving the input specifying different data format representations for respective different material properties can include receiving selections of predefined properties provided by an interface. The method can include presenting a list of predefined properties having respective recommended data format representations; and receiving a selection of another data format representation for a property that is different from a recommended data format representation for that property. In addition, the method can include determining a recommended data format representation for a property based on an available processor resource.

The interface can include an application programming interface, and the method can include defining a new property through the application programming interface using input including a property name, a specification of value type, and a selection of a data format representation. The method can include calling, through the application programming interface, a sampling function for each of the different properties to obtain output values from the different data format representations at a specified resolution; and combining the output values for provision to a manufacturing system. The input for defining the new property through the application programming interface can include a selected interpolant, and calling a sampling function for the new property can include using the selected interpolant.

The manufacturing system can include an additive manufacturing system, such as a 3D printer. The additive manufacturing system can be configured to build the object using different materials. For example, a 3D printer can be configured to 3D print the object using different metals, which are combined to form different alloys in the object that is 3D printed.

The different data format representations can include at least one discretized data format representation and at least one continuous data format representation. The different data format representations can include at least one surface representation and at least one volume representation. The at least one surface representation can include a surface representation used to model a sharp transition between one set of material properties and another set of material properties within the object. Further, the at least one volume representation can include two or more discretized volume representations, which have respective different resolutions.

According to another aspect, a system includes one or more computer storage media having instructions stored thereon; and one or more data processing apparatus configured to execute the instructions to perform operations including (i) receiving input specifying different material properties of an object to be manufactured (e.g., using different materials), (ii) generating from the input a three dimensional (3D) model of the object using overlapping volume representations of the different material properties of the object, where the overlapping volume representations have overlapping 3D coordinate systems, but employ different data formats and different resolutions, and (iii) storing the 3D model of the object for use in manufacturing the object (e.g., using the different materials).

Each of the overlapping volume representations can have an associated sampling function to provide output values of the representation's property at a specified resolution. Each sampling function can have an associated interpolant that has been assigned for the overlapping volume representation associated with the sampling function. The generating can also use one or more surface representations of at least one additional material property for the object in the 3D model. The one or more surface representations can include a surface representation used to model a sharp transition between one set of material properties and another set of material properties within the object. In addition, the one or more surface representations can include a level-set representation and an implicit surface representation, and the overlapping volume representations can include a multi-resolution grid representation.

The overlapping volume representations can include one or more representations for each of a chemical property, an electrical property, a mechanical property, an optical property, a thermal property, and a magnetic property. The chemical property can include a coating and a rate of corrosion, the electrical property can include a dielectric constant and an electrical conductivity, the mechanical property can include linear elasticity parameters and surface roughness, the optical property can include color and refractive index, and the thermal property can include thermal conductivity and thermal expansion. The overlapping volume representations can include a narrow-band grid representation, a sparse uniform grid representation, a signed/unsigned distance function representation, and an implicit volume representation.

The overlapping volume representations can include a narrow-band grid representation, a dense uniform grid representation, a density distribution function representation, and an implicit volume representation. The overlapping volume representations can include a multi-resolution grid representation, a signed/unsigned distance function representation, and a radial basis volume function representation. Further, the overlapping volume representations can include a signed/unsigned distance function representation, a density distribution function representation, and a Boolean volume tree representation.

Particular embodiments of the subject matter described in this specification can be implemented to realize one or more of the following advantages. A data structure used for a 3D model can be flexible in that different representations can be used for different properties of the object being modelled. This flexibility can include both the data format of the representations, where a most appropriate representation format can be used for each type of spatial property, as well as different resolutions, where some properties of the object may be defined at lower resolutions, or higher resolutions, or using continuous data that use mathematical expressions to define values at any desired resolution. Thus, multiple resolutions and smooth variation can be handled.

This flexible approach to data structures in 3D models can have particular value in additive manufacturing systems, such as 3D printers that use multiple materials, where different materials can be combined or blended in different amounts, and/or properties of the material can modified during or after its addition, as an object is built in an additive manufacturing process. As new types of 3D printers become available, with different types of usable materials, new data format representations appropriate for the capabilities of the new 3D printers can readily be used with both previously created 3D models and new 3D models. For example, future 3D printers will likely have the ability to form bespoke alloys using different amounts of various metals while the 3D printer is operating, allowing the material properties to vary smoothly and/or sharply across the surface and the volume of individual shapes. Such 3D printers will be able to fashion elements of the object being printed with specified properties at each point by mixing the components of the alloy specifically at each point in space, which will enable the creation of a wide variety of material properties that can be structural, thermal, electromagnetic, etc., as well as surface properties such as hardening or coating.

The systems and techniques described herein can facilitate 3D modelling for such 3D printers. For example, complex ensembles of material properties can be readily used, allowing sophisticated multi-disciplinary shape synthesis and optimization. Moreover, the systems and techniques described can be applied to processes other than 3D printing, including various combinations of manufacturing processes that can benefit from the simultaneous representation, analysis and manipulation of complex, multiple property 3D models, such as processes that can be used in sequences, e.g., forging, milling, coating, etc.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
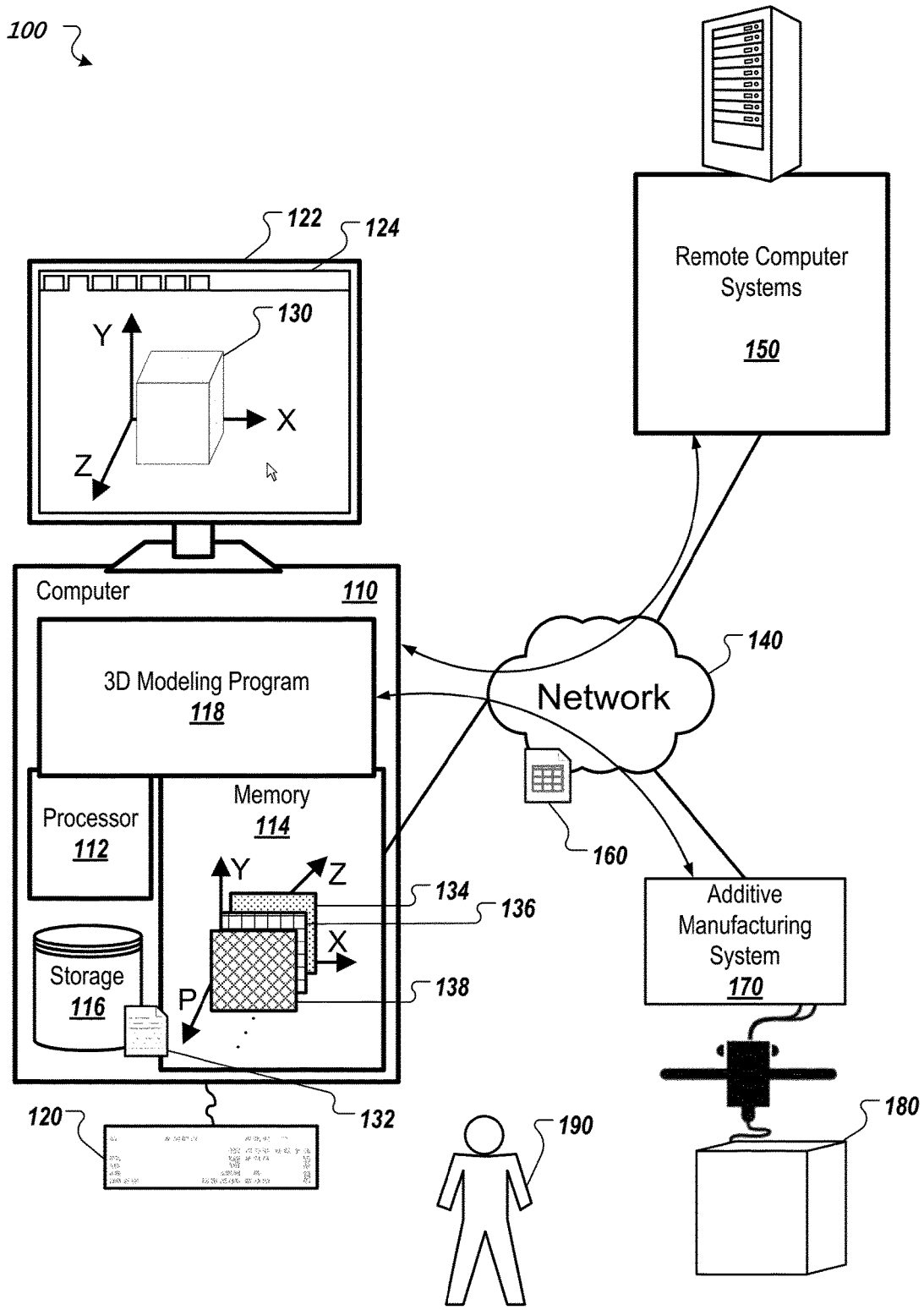
FIG. 1 shows an example of a system that provides a three dimensional (3D) modeling framework for multi-material 3D models.

FIG. 1 shows an example of a system 100 that provides a three dimensional (3D) modeling framework for multi-material 3D models. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include volatile and/or non-volatile memory, such as Random Access Memory (RAM) and Flash RAM. The computer 110 can include various types of computer storage media and devices, which can include the memory 114 and a persistent storage device 116 (e.g., a hard disk drive), to store instructions of programs that run on the processor 112 as well as data therefor.

Such programs can include a 3D modeling program 118, which can run locally on computer 110 or remotely on a computer of one or more remote computer systems 150 (e.g., in a server system accessible by the computer 110 via the network 140). The 3D modeling program 118 presents a user interface (UI) 124 on a display device 122 of the computer 110, which can be operated using one or more input devices 120 of the computer 110 (e.g., keyboard and mouse). Note that while shown as separate devices in FIG. 1, the display device 122 and/or input devices 120 can also be integrated with each other and/or with the computer 110, such as in a tablet computer.

A user 190 can interact with the 3D modeling program 118 to create a 3D model 130 of an object 180 to be created using an additive manufacturing (AM) system 170 (e.g., 3D printed using a multi-material 3D printer). The AM system 170 can be connected to the computer 110 through the network 140 (as shown) or directly connected to the computer 110. The creation of the 3D model 130 can be done using known graphical user interface tools, and the display device 122 can present a view of the 3D object being modeled in three dimensions (X, Y, and Z) as a projection into the two dimensional space of the display device 122 (as shown). In addition, the UI 124 of the program 118 can allow the user 190 to provide input specifying different properties of the object at different locations. The AM system 170 can manufacture the object 180 to have the different specified properties, such as by employing different additive manufacturing process specifics (e.g., modifying laser intensity in a laser sintering system) in accordance with the specified different properties, employing different combinations of different input materials (e.g., modifying which metals are used, and/or the amounts thereof, to form alloys) in accordance with the specified different properties, or both, to match the desire properties for the object 180. Although shown here as a simple box, it will be appreciated that much more complicated objects can be modelled and printed.

When different properties are specified for the 3D model 130 of the object 180, the program 118 can generate separate but overlapping representations 134, 136, 138 of the model 130 for the respective properties. These separate representations are shown as a projection of a four dimensional object into the two dimensions of the page for ease of explanation, i.e., each respective property of the object model 130 can be thought of as a slice of the object at a particular point along a property (P) dimension of the object. Each such slice 134, 136, 138 is used to save data for the object model 130 within a domain of a three dimensional (X, Y, Z) volume, and the representations are overlapping in the sense that each representation 134, 136, 138 can define its respective property of the object within that same domain of 3D space. In other words, each of the representations 134, 136, 138 have overlapping 3D coordinate systems.

In addition, each representation 134, 136, 138 can employ an entirely different data format, different resolution, or both, from every other representation 134, 136, 138. For example, the representations 134, 136, 138 can be overlapping volume representations that employ different data formats and different resolutions for the different properties of an object to be 3D printed. Of course, in some cases, one or more properties can use the same data format and same resolution as used for data of another different property of the object model 130. In general, the program 118 can make available various different types of data structures and interfaces for storing and accessing data, which can be selected (by user or by program) to instantiate representations of different properties of the object being modelled.

The different types of representations made available by the program 118 can include one or more volume representations, which can be used to define three dimensional scalar data or vector data fields, and one or more surface representations, which can be used to define two dimensional scalar data or vector data fields. Examples of volume representations include parametric volumes, a Boolean volume tree representation, a radial basis volume function representation, an implicit volume representation, a density distribution function representation, a signed/unsigned distance function representation, a point cloud representation, and one or more Eulerian grid representations, such as a Narrowband grid representation, a sparse uniform grid representation, a dense uniform grid representation, a non-uniform spatial partitioning representation, and a multi-resolution grid representation. Examples of surface representations include parametric surfaces (e.g., NURBs, T-Splines), a level-set representation, an implicit surface representation, a Boolean surface tree representation, and a polygon mesh representation.

Note that the surface representations can be used to indicate discontinuities within the object (whether of material or state) in addition to the edges of the object (discontinuities between what is and is not part of the object). For example, a surface representation can be used to model a sharp transition (e.g., at points definable in increments smaller than the smallest discretized representation) between one set of material properties and another set of material properties within the object. Such surface representations can define the boundary between one location in the object with one material property and another location in the object with a different material property, either alone or in combination with other surface and/or volume representations in the 3D model 130.

In addition, the AM system 170 can manufacture the object 180 to have the different specified properties. In some implementations, this involves employing different additive manufacturing process specifics (e.g., modifying laser intensity in a laser sintering system) in accordance with the specified different properties when manufacturing the object 180. In some implementations, this involves employing different combinations of different input materials (e.g., modifying which metals are used, and/or the amounts thereof, to form alloys) in accordance with the specified different properties. In some implementations, the AM system 170 can manufacture the object 180 to match the desire properties therefor using both different additive manufacturing process specifics and different combinations of different input materials. At least one of the different representations 134, 136, 138 can be used to specify different combinations of different input materials (e.g., mixing of different materials during a material layering process to generate a new material), and at least one of the different representations 134, 136, 138 can be used to specify different additive manufacturing process specifics (e.g., pointwise process control of temperature, pressure, etc.) to provide localized control of the manufacturing process performed by the AM system 170 (e.g., by varying the control coefficients fed to the AM system 170 to get the desired material properties in the 3D domain of the object 180).

In any case, the different representations 134, 136, 138 of an object can be populated, saved and manipulated in memory 114, and these different representations can also be stored as a document 132 for later reloading, reediting (as needed) and manufacture (e.g., 3D printing). Thus, the representation of the model 130 in memory and on disk can be understood as a hybrid representation in that the data structure has the ability to contain and manipulate data structures of various different kinds, where those data structures are saved as different representations of material properties that are generally collocated in space to define the 3D object (note that they may not be exactly collocated since they can have different resolutions, but they will define the different properties of the object across a common 3D domain, which includes the overlapping 3D coordinate systems of the different representations).

In addition, the document 132 can be sent over the network 140, such as to an online marketplace server system 150 for 3D models made available for sale and 3D printing. Note that an electronic document (which for brevity will simply be referred to as a document) can be a file, but does not necessarily correspond to a file. A document may be stored in a portion of a file that holds other documents, in a single file dedicated to the document in question, or in multiple coordinated files.

Furthermore, the program 118 can provide an associated sampling function for each different representation 134, 136, 138, which can provide output values of that representation's property data at a specified resolution. This can be used both in generating visual preview data of the 3D model 130 in the UI 124 and also in generating an output document 160, which the AM system 170 can use to build the object 180. For example, the 3D modeling program 118 can store information regarding the capabilities of the AM system 170 (or retrieve this information from the AM system 170) and use this capabilities information (potentially in combination with input from the user 190) to obtain data samples from the different representations 134, 136, 138 at an appropriate resolution and combine those data samples into an output format usable by the AM system 170 to print the object 180 by combining different materials to create structures with the desired properties.

In addition, in some implementations, the sampling functions associated with the different representation 134, 136, 138 can be changed. For example, the system 100 can include multiple available interpolants, which can be selectively assigned to a representation 134, 136, 138. Thus, different instantiations of a single type of representation can have different assigned interpolants, which results in different behavior. Each interpolant specifies an algorithm to interpolate between data points, where the algorithm can allow resolutions that are higher than a resolution of a discrete representation. In some implementations, the available interpolants can employ piecewise constant interpolation, linear interpolation, polynomial interpolation, and spline interpolation. More or fewer interpolants can be used, as well as interpolants that employ other forms of interpolation or even Gaussian processes. The use of different interpolants provides additional flexibility in the creation of the different representations 134, 136, 138 for the 3D model 130, and the different interpolants allow the 3D model 130 to describe material property distributions with resolutions that are higher than the underlying discretizations used by the different representations 134, 136, 138 for the 3D model 130.

The different properties that are specified in the 3D model 130 for the object 180 can include one or more chemical properties (e.g., a coating and a rate of corrosion), one or more electrical property (e.g., a dielectric constant and an electrical conductivity), one or more mechanical properties (e.g., linear elasticity parameters and surface roughness), one or more optical properties (e.g., color and refractive index), one or more thermal properties (e.g., thermal conductivity and thermal expansion), one or more magnetic properties (e.g., magnetic permeability), or various combination of these (e.g., electromagnetic properties, such as can be specified for radio frequency (RF) antenna structures that will be built by the AM machine 170). Moreover, different representations may be more or less appropriate for different properties, and the 3D modeling program 118 can be designed to include a set of available properties, along with the available representations, and also provide recommendations for one or more representations to use with each of the available properties. The following table provides examples of available representations and recommended assignments of representations to material properties, according to some implementations.

TABLE 1

| | Chart of Recommended Representations for Properties | | | | | | | |
|---|---|---|---|---|---|---|---|---|
| | Narrow-band grid | Sparse uniform grid | Dense uniform grid | Non-uniform spatial partitioning | Multi-resolution grid | Signed/Unsigned distance funtction | Density distribution function | Implicit volume |
| Chemical properties | | | | | | | | |
| Coating | ○ | | | | | ○ | | |
| Rate of corrosion | ○ | ○ | | | ○ | | ○ | |
| Electrical properties | | | | | | | | |
| Dielectric constant | | | | | ○ | ○ | | ○ |
| Electrical conductivity | | ○ | ○ | ○ | ○ | ○ | | |
| Mechanical properties | | | | | | | | |
| Linear elasticity parameters | | | ○ | | ○ | ○ | ○ | |
| Surface roughness | ○ | ○ | | ○ | ○ | | ○ | |
| Optical properties | | | | | | | | |
| Color | ○ | | | | ○ | | ○ | |
| Refractive index | | | | | | | | ○ |
| Thermal properties | | | | | | | | |
| Thermal conductivity | ○ | ○ | | ○ | ○ | | ○ | |

TABLE 1-continued

Chart of Recommended Representations for Properties

| | Radial basis volume function | Boolean volume tree | Level-set | Implicit surface | Boolean surface tree | Polygon mesh | NURBS |
|---|---|---|---|---|---|---|---|
| Thermal expansion | | | | | ○ | ○ | |
| Chemical properties | | | | | | | |
| Coating | | | ○ | ○ | | | |
| Rate of corrosion | | | | | | | |
| Electrical properties | | | | | | | |
| Dielectric constant | ○ | | ○ | | | | |
| Electrical conductivity | | | | | | | |
| Mechanical properties | | | | | | | |
| Linear elasticity parameters | | | | | | | |
| Surface roughness | | | | | | | |
| Optical properties | | | | | | | |
| Color | | ○ | | ○ | ○ | ○ | ○ |
| Refractive index | ○ | ○ | ○ | ○ | ○ | ○ | ○ |
| Thermal properties | | | | | | | |
| Thermal conductivity | | | | | | | |
| Thermal expansion | | | ○ | | | | |

Figure 2:
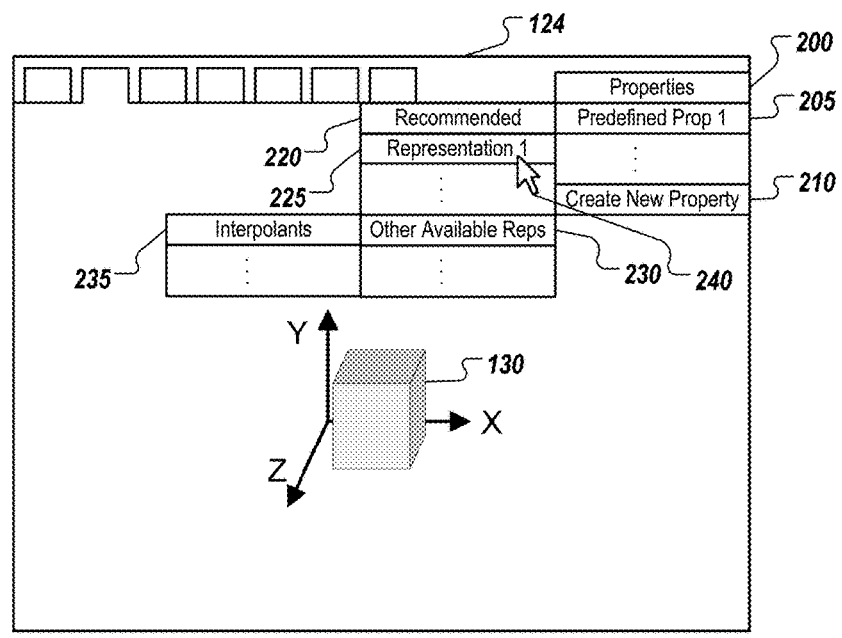
FIG. 2 shows an example of a user interface for selecting properties and representations therefor.

FIG. 2 shows an example of the UI 124 from FIG. 1, with the 3D model 130 being created, along with UI elements for selecting properties and representations therefor. A properties interface 200 enables a user to select from a set of predefined properties 205, such as listed above in Table 1. When a predefined property is selected, a recommended representations interface 220 can list both a subset of all available representations for that predefined property, which are the recommended representation(s) 225, plus any other available representation(s) 230. Thus, the user can quickly see what options are available, including which data representation may be best for a given property in the 3D model. In some implementations, hovering a cursor 240 over a particular representation can cause a pop-up display screen to show additional information regarding why that representation is recommended, providing the user with further insight into the best representation to use in light of the specific design intentions for the 3D model 130. In some implementations, the UI elements 200-230 can also enable selection of an interpolant (from a list of available interpolants 235) for use in sampling the data in the representation.

The UI shown in FIG. 2 can be built into the 3D modelling program 118 from FIG. 1, and it can also utilize an underlying application programming interface (API) that enables both the user and programs to create a new property using one or more of the available representations. The user can do this through a create new property interface 210, whereas a program can do this directly by calling the methods defined by the API. In some implementations, interpolants can also be selected for new properties that are created, through the UI, through the API, or both. In addition, the system can be modular and allow new representations to be added to the list of available representations. Thus, both the available data format representations and the set of defined properties can grow over time.

Figure 3:
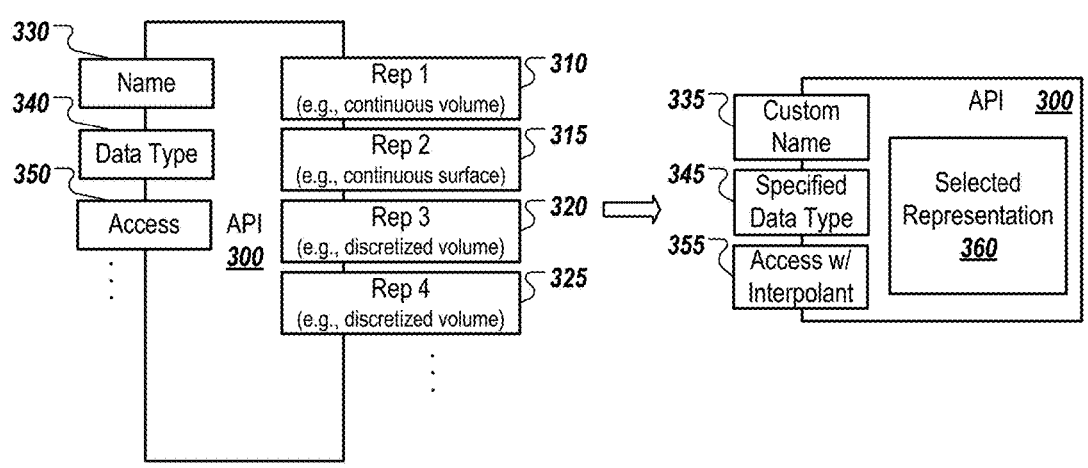
FIG. 3 shows an example of an application programming interface useable to create customized new properties.

FIG. 3 shows an example of an API 300 useable to create customized new properties. The API 300 defines one or more access methods 350 to multiple different types of data format representations 310, 315, 320, 325. The representations 310, 315, 320, 325 can include one or more discretized data format representations and one or more continuous data format representations. The representations 310, 315, 320, 325 can include one or more surface representations and one or more volume representations. For example, the representations 310, 315, 320, 325 can include a continuous volume representation 310, a continuous surface representation 315, a first discretized volume representation 320, and a second discretized volume representation 325, where different resolutions can be used for properties created using the first discretized volume representation 320, the second discretized volume representation 325, or both. Note that the continuous surface representation 315 can be used to model various aspects of the object, as described above (e.g., a sharp transition between one set of material properties and another set of material properties within the object), and the volume representations 310, 320, 325 can also be used to model various aspects of the same object, as described above (e.g., one or more overlapping volume representations for each of a chemical property, an electrical property, a mechanical property, an optical property, and a thermal property, and a magnetic property).

The access method(s) 350 include at least one common access method, such as a sampling method that provides the ability to sample the data of an underlying representation at any point in space within the boundary of a defined domain. In some implementations, the sampling access method also allows specification of a resolution level (or volume of space around the point) at which to sample. In some implementations, the sampling access method can employ an interpolant for a discretized representation (volume or surface), where the interpolant is selectively assigned from a set of available interpolants. The common access method(s) will be supported by all properties created through the API 300. In addition, one or more of the data format representations 310, 315, 320, 325 can have specialized access method(s) that are not applicable to other data format representations 310, 315, 320, 325. In some implementations, such specialized access method(s) can also employ selectively assigned interpolants.

The API 300 can also include one or more methods through which new properties are created. In FIG. 3, both a name method 330 and a data type method 340 are shown for ease of reference, but a single method can be defined that allows specification of name and/or data type for either predefined properties being modified or entirely new properties. And different methods can also be employed. In general, the API 300 enables creation of a property instance where a selected representation 360 is used to store data, and a custom name 335 and specified data type 345 (e.g., scalar value or vector value) can be defined for the new property instance, where the API 300 acts as a wrapper for the selected representation 360 to simplify access to the property data through one or more access methods, such as a specialized access method with selected interpolant 355 that is used to sample data of the new property instance.

A 3D model of an object can consist of many of these property instances, and the set of access methods 350 across the 3D model can be used as a kind of vector function that can sample at any point in space and return a vector of values that represent different properties of a volume at that point. Using the common access method definition of the API 300, this vector function view can be true even as the properties are very different from each other and use very different underlying representations, such as surface properties, boundary properties, volume properties, density properties, structural properties (e.g., part of the structural tensor properties of the material at that point), thermal properties, optical properties, acoustic properties, etc. Thus, by creating the common access method(s) 350, accessing software (e.g., for a particular 3D printer) need not have any visibility into how each of the properties are represented internally; they can simply sample the data at each point in space to obtain a surface, a slice, the material index or stiffness tensor, or any other property they are interested in.

Figure 4:
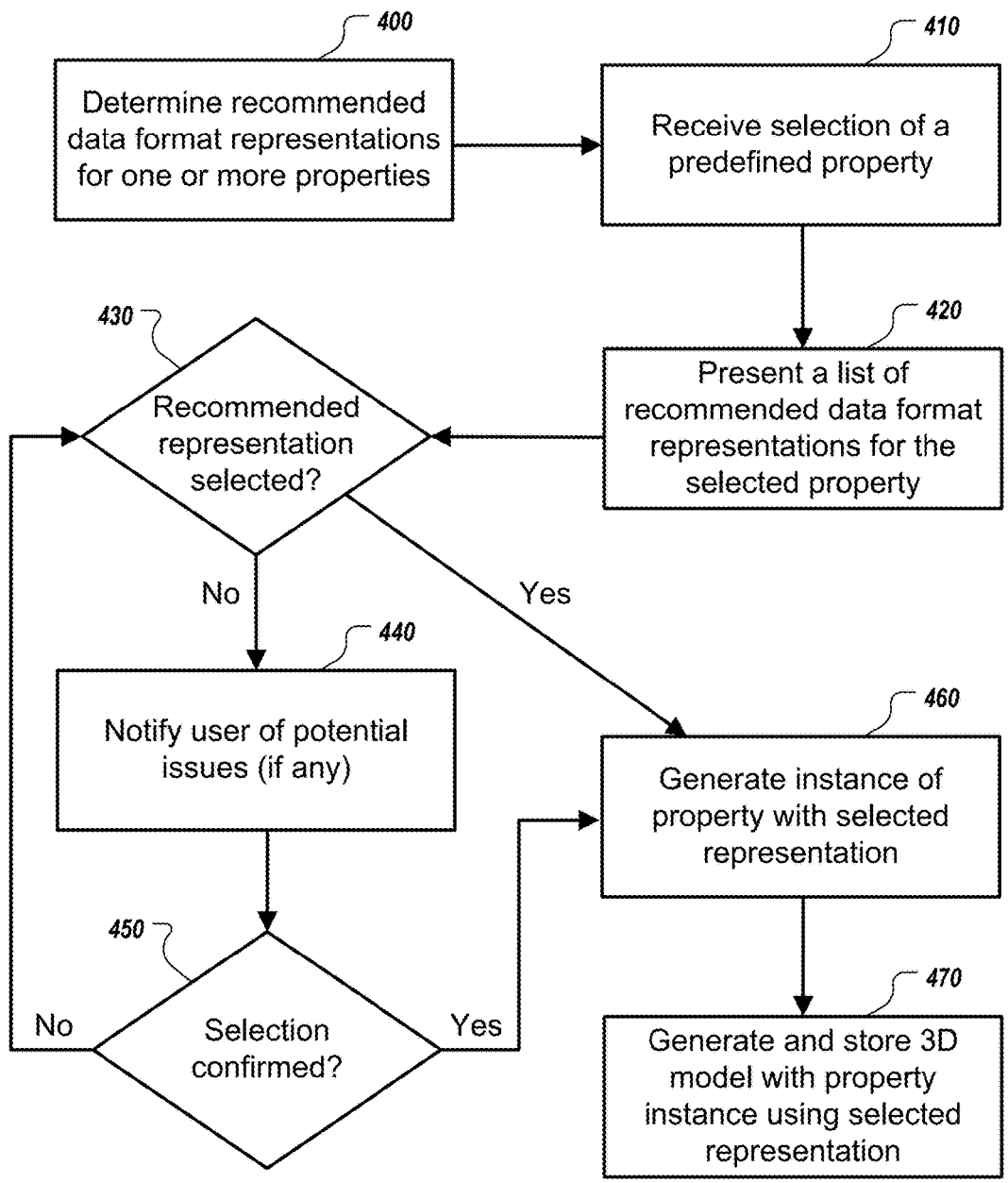
FIG. 4 shows an example of a process for selecting a representation to use for a property in a 3D model.

FIG. 4 shows an example of a process for selecting a representation to use for a property in a 3D model. At 400, one or more recommended data format representations can be determined for one or more properties. This can involve loading recommendations provided by an outside source or active analysis based on a current situation. For example, a recommended data format representation can be determined for a property based on an available processor resource. In some implementations, representation(s) can be selected to leverage accelerated and parallel computing resources on the local computer as much as possible, so as to maximize performance while manipulating the data. In some implementations, the selection is based on a combination of underlying considerations, including the spatial and temporal locality of the property to be represented (how frequently the application modifies a property at a specific location or globally, and the extent of the modifications), and the dimensionality of the property field (uniform vs. non-uniform, and amount of variability in space).

At 410, a selection of a predefined property is received. This can include receiving selection through the UI element 205 shown in FIG. 2, and a set of recommended representations can be associated with each available predefined property, such as shown above in Table 1. Thus, input can be received to specify different data format representations for respective different properties of an object to be printed with a 3D printer using different materials, by using predefined properties that can be customized, by creating entirely new properties, or both. Manufacturing processes other 3D printing can also be used, such as computer numerical control (CNC) milling.

In this example, at 420, a list of recommended data format representations is presented for the selected predefined property. A selection of data format representation can be made at 430, and this can be one of the recommended representations, or a selection of another data format representation can be received, where the selected representation is not one of the recommended representations. In this situation, a user can be notified of any potential issues with the selection at 440, and a confirmation request input can be received at 450.

When a recommended selection is received, or a non-recommended selection is confirmed, an instance of the predefined property can be created at 460 with the selected representation. This property instance can be used to hold data that further defines a 3D model being created, and thus the 3D model can be generated and stored at 470 with the property instance using the selected representation. This process can be repeated to generate a 3D model of an object with multiple properties, and the various underlying representations can enable efficient manipulation and storage of all the different object characteristics in the most effective way for each property one is interested in storing.

As will be appreciated, extending objects from a pure shell representation (as traditionally done in CAD software) to a true volumetric representation will increase the storage space requirements. However, using the flexible data structure approach described herein, this increase in disk storage space requirements can be effectively managed, and additional efficiencies in terms of memory and processor usage can be realized. For example, different representations can be stored at different resolutions, such as a sparse grid to represent the boundary layer around the surface of an object, whereas other properties can use a dense grid (e.g., for 3D printing), but actually be sampled at the coarser resolution (e.g., for display purposes). In addition, various forms of compression and access algorithms (e.g., wavelets and procedural kernels) can be used to create multi-resolution representations that are a compromise between speed of manipulation and efficiency of storage. In some implementations, maximum compression of data can be used for long term storage, uncompressed data can be used in memory for maximum performance for users, and sampling and interpolation of the data for generating a 3D print file can occur with the data loaded in compressed form in memory.

Figure 5:
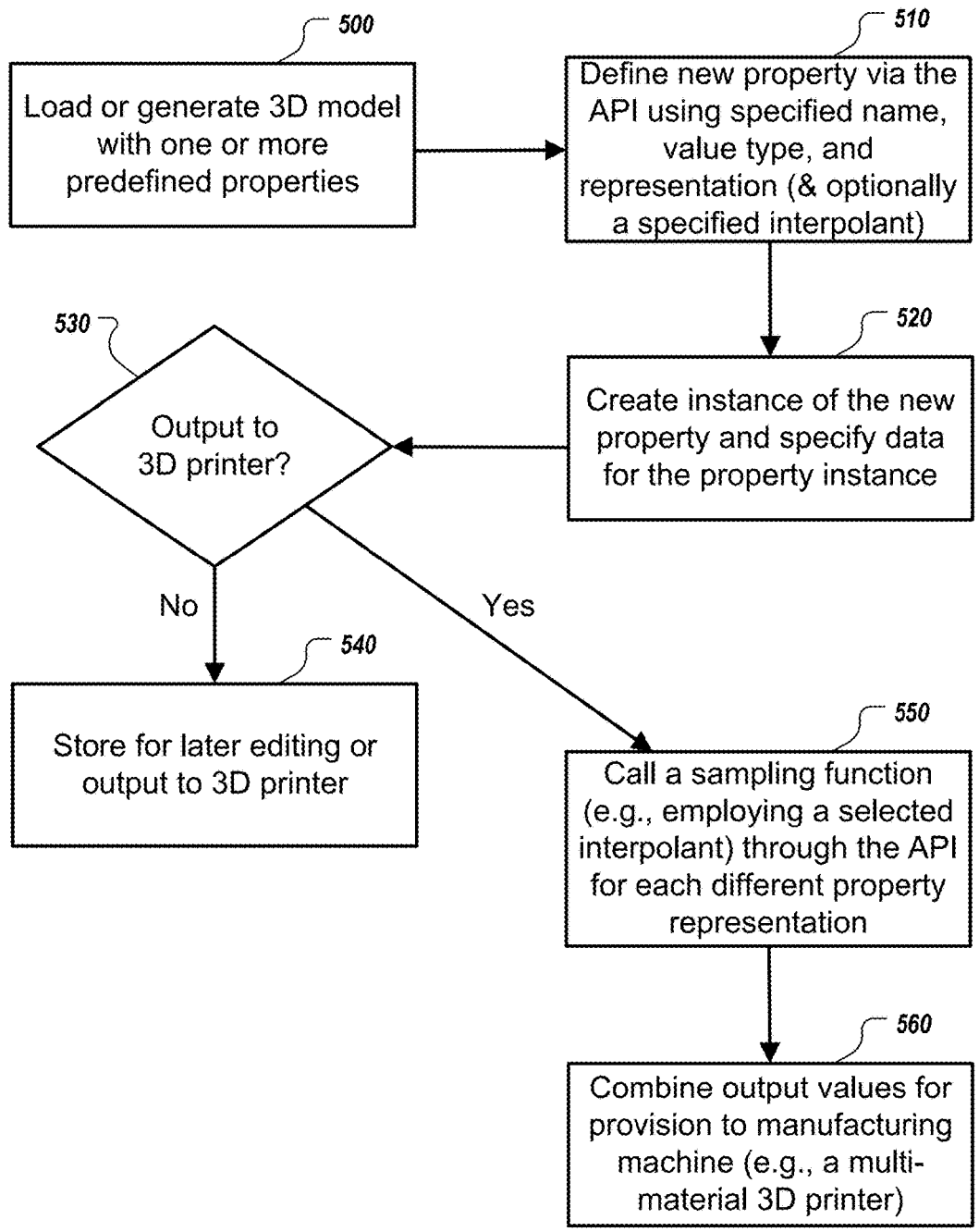
FIG. 5 shows an example of a process for defining a new property for a 3D model and outputting a 3D model to a 3D printer.

FIG. 5 shows an example of a process for defining a new property for a 3D model and outputting a 3D model to a 3D printer. At 500, a 3D model with one or more predefined properties is loaded or generated, such as described above. At 510, a new property is defined through an API using a specified property name, a specification of value type (e.g., scalar value or vector value), and a selection of a data format representation (and optionally specification of an interpolant to use for the sampling function). At 520, an instance of the new property is created, and data is specified for the 3D model using the new property instance to store the data in the selected data format representation. For example, when the object of the 3D model is to be fabricated by CNC milling, the new property can represent various forms of surface coating in different areas of its surface, which can require special CNC milling treatment of the 3D model in the areas that receive the coatings.

At 530, input can be received to indicate either output to a 3D printer or storing the 3D model for later use. At 540, the 3D model, including the new property instance and its data, can be stored for later use with the 3D printer. At 550, a sampling function can be called, through the API, for each of the different properties used to define the 3D model to obtain output values from the different data format representations at a specified resolution. This can include employing the selected interpolant in the sampling function for the instance of the new property defined at 510. At 560, these data output values can be combined for provision to a manufacturing machine/system (e.g., an AM machine, such as a multi-material 3D printer) to create the object (e.g., to 3D print the object using the different materials). For example, a multi-material 3D printer can be directed to 3D print an object using different metals that are combined to form different alloys in the object that is 3D printed, and different amounts of the metals can be determined at 560 based on the sampled values for the different properties. Moreover, as noted above, manufacturing processes other 3D printing can also be used, such as CNC milling, and so the data output values can also be combined for provision to other types of manufacturing machines.

Figure 6:
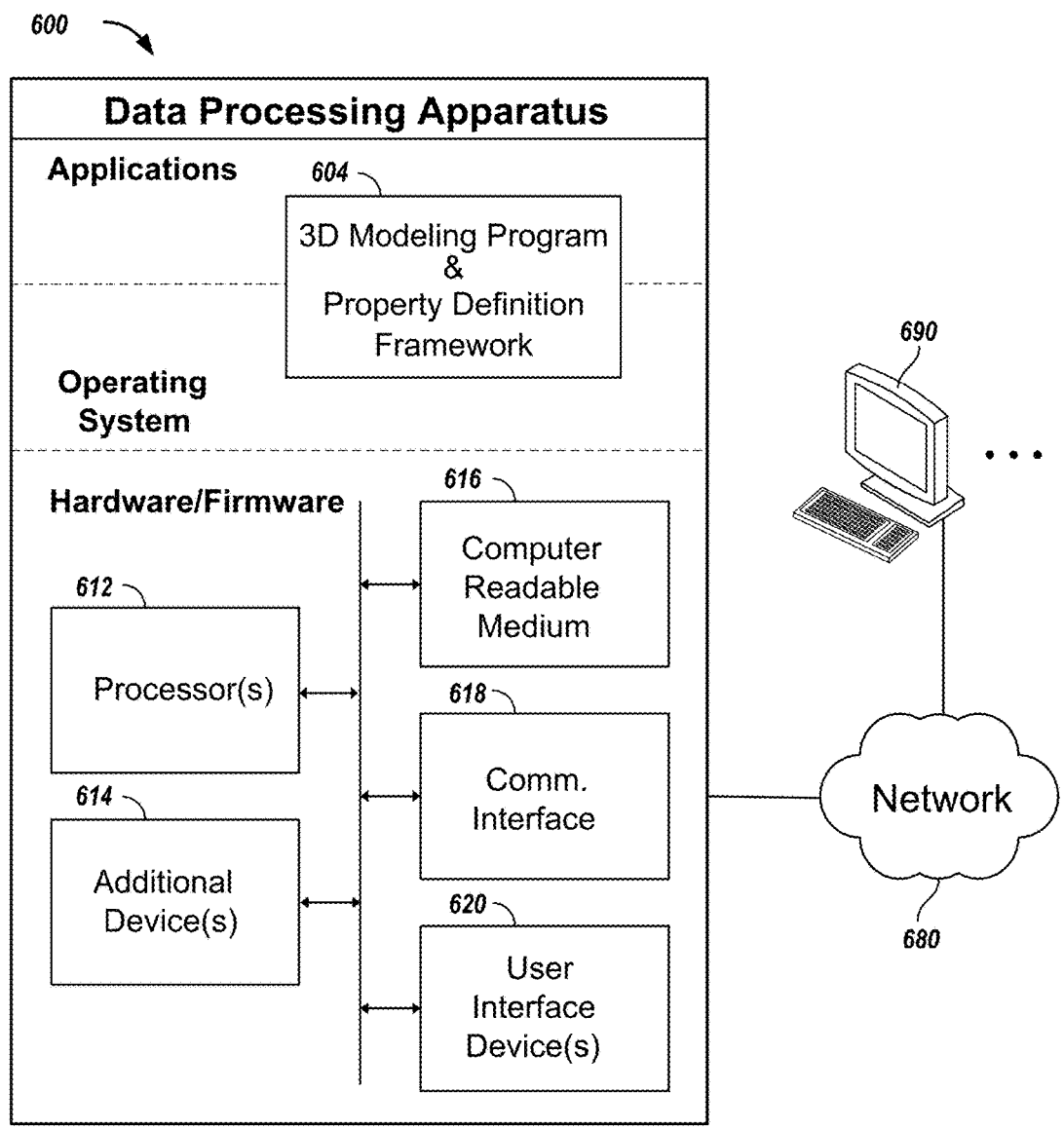
FIG. 6 is a schematic diagram of a data processing system.

FIG. 6 is a schematic diagram of a data processing system including a data processing apparatus 600, which can be programmed as a client or as a server. The data processing apparatus 600 is connected with one or more computers 690 through a network 680. While only one computer is shown in FIG. 6 as the data processing apparatus 600, multiple computers can be used. The data processing apparatus 600 includes various software modules, which can be distributed between an application layer and an operating system. These can include executable and/or interpretable software programs or libraries, including tools and services of a 3D modeling program and property definition framework 604, such as described above. The number of software modules used can vary from one implementation to another. Moreover, the software modules can be distributed on one or more data processing apparatus connected by one or more computer networks or other suitable communication networks.

In general, the 3D modeling program and property definition framework 604 can be viewed as a set of tools that enable creation of new data structures for representing volumetric spatial structures, which can be efficiently manipulated for the purpose of procedural generation, modeling and simulation. Each such data structure can include a set of spatially overlapping, hierarchical, sparse scalar and vector fields, which can represent boundary properties as signed and unsigned distance functions defining iso-surfaces/level sets, vector distance fields, spatial distributions of arbitrary material properties represented as n dimensional vectors. Different levels in the hierarchy of bounding volumes can utilize multiple volume representations, such as (1) scalar and vector fields to represent direct values (e.g., a signed distance function) or quantized data as indices into lookup tables (e.g., indices into a palette of materials or material properties), (2) voxel grids to represent regular distributions of properties, and (3) spatial patterns to represent procedurally defined repeating/periodic properties (e.g., lattices).

Spatial portions and dimensional portions of the vector fields representing distributions of material properties can be independently quantized and/or compressed using various techniques such as Discrete Cosine Transform (DCT), wavelets and other methods. The different overlapping vector/scalar fields can have independent resolutions. Additionally, spectral methods can be used to represent distributions of properties in space implicitly, without explicit storage inside a dense or sparse scalar or vector field. Similarly, kernel methods with multiple spatial distribution vector field support kernels can be combined using arbitrary formulae to implicitly define portions of the volume.

Voxel grids can also represent various interpolations of properties across their volumes at different resolutions, e.g., a coarse voxel can represent a compressed interpolation model of a higher resolution set of voxels occupying the same volume using forms of homogenization, or representations of microstructures inside the volume and on/near the surface. The structure can be sampled at arbitrary resolutions to obtain different representations appropriate for specific analysis purposes. One example is sampling in dense volumetric tetrahedral form for the purpose of Finite Element Analysis (FEA). Several traditional methods of computing structural stress, heat diffusion, fluid flow, etc. utilize FEA, which requires subdividing a 3D volume into 3D elements of known topology and evaluating a linearized expression of the partial differential equations involved in the analysis. The two most common types of elements are tetrahedral (triangular pyramids) and hexahedra (cubes, bricks).

The data processing apparatus 600 also includes hardware or firmware devices including one or more processors 612, one or more additional devices 614, a computer readable medium 616, a communication interface 618, and one or more user interface devices 620. Each processor 612 is capable of processing instructions for execution within the data processing apparatus 600. In some implementations, the processor 612 is a single or multi-threaded processor. Each processor 612 is capable of processing instructions stored on the computer readable medium 616 or on a storage device such as one of the additional devices 614. The data processing apparatus 600 uses its communication interface 618 to communicate with one or more computers 690, for example, over the network 680. Examples of user interface devices 620 include a display, a camera, a speaker, a microphone, a tactile feedback device, a keyboard, and a mouse. The data processing apparatus 600 can store instructions that implement operations associated with the modules described above, for example, on the computer readable medium 616 or one or more additional devices 614, for example, one or more of a floppy disk device, a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, the actions recited in the claims can be performed in a different order and still achieve desirable results. Moreover, other applications of the systems and techniques described include geometry synthesis and topology optimization. In the first case, the geometry representations can be selected automatically and the data can be synthesized using shape synthesis algorithms, which is different from conventional CAD. In the second case, the multiple representations can be used to not only to perform analysis on the geometry, but also to use both the analysis and the geometry itself as a guide to perform shape and topology optimization operations. In both such cases, the representations offer different features that can be exploited for synthesis and optimization, such as direct computation of shape gradient, medial-axis, Laplacian operator, local and global curvature, surface area, volume, local thickness, etc.

What is claimed is:

1. A system comprising:
one or more computer storage media having instructions stored thereon; and
one or more data processing apparatus configured to execute the instructions to perform operations comprising (i) receiving input specifying different material properties of an object to be manufactured, (ii) generating from the input a three dimensional (3D) model of the object using overlapping volume representations of the different material properties of the object, wherein the overlapping volume representations employ different data formats and different resolutions, and (iii) storing the 3D model of the object for use in manufacturing the object.

2. The system of claim 1, wherein each of the overlapping volume representations has an associated sampling function to provide output values of the representation's material property at a specified resolution.

3. The system of claim 2, wherein each sampling function has an associated interpolant that has been assigned for the overlapping volume representation associated with the sampling function.

4. The system of claim 1, wherein the generating also uses one or more surface representations of at least one additional material property for the object in the 3D model.

5. The system of claim 4, wherein the one or more surface representations comprise a surface representation used to model a sharp transition between one set of material properties and another set of material properties within the object.

6. The system of claim 4, wherein the one or more surface representations comprise a level-set representation and an implicit surface representation, and the overlapping volume representations comprise a multi-resolution grid representation.

7. The system of claim 1, wherein the overlapping volume representations comprise one or more representations for each of a chemical property, an electrical property, a mechanical property, an optical property, a thermal property, and a magnetic property.

8. The system of claim 7, wherein the chemical property comprises a coating and a rate of corrosion, the electrical property comprises a dielectric constant and an electrical conductivity, the mechanical property comprises linear elasticity parameters and surface roughness, the optical property comprises color and refractive index, and the thermal property comprises thermal conductivity and thermal expansion.

9. A method comprising:
receiving input specifying different data format representations for respective different material properties of an object to be manufactured, wherein the different data format representations comprise two or more discretized data format representations having respective different resolutions;
generating a 3D model of the object within a 3D space using the different data format representations to store values for the different material properties that overlap in the 3D space; and
storing the 3D model of the object for use in manufacturing the object.

10. The method of claim 9, wherein receiving the input specifying different data format representations for respective different material properties comprises receiving selections of predefined properties provided by an interface.

11. The method of claim 10, comprising:
presenting a list of predefined properties having respective recommended data format representations; and
receiving a selection of another data format representation for a property that is different from a recommended data format representation for that property.

12. The method of claim 11, comprising determining a recommended data format representation for a property based on an available processor resource.

13. The method of claim 10, wherein the interface comprises an application programming interface, and the method comprises defining a new property through the application programming interface using input comprising a property name, a specification of value type, and a selection of a data format representation.

14. The method of claim 13, comprising:
calling, through the application programming interface, a sampling function for each of the different material properties to obtain output values from the different data format representations at a specified resolution; and
combining the output values for provision to a manufacturing system.

15. The method of claim 14, wherein the input for defining the new property through the application programming interface further comprises a selected interpolant, and calling a sampling function for the new property comprises using the selected interpolant.

16. The method of claim 14, wherein the manufacturing system comprises a 3D printer configured to 3D print the object using different metals, which are combined to form different alloys in the object that is 3D printed.

17. The method of claim 9, wherein the different data format representations comprise at least one continuous data format representation.

18. The method of claim 17, wherein the different data format representations comprise at least one surface representation and at least one volume representation.

19. The method of claim 18, wherein the at least one surface representation comprises a surface representation used to model a sharp transition between one set of material properties and another set of material properties within the object.

20. The method of claim 18, wherein the at least one volume representation comprises two or more discretized volume representations having respective different resolutions.

21. A computer storage medium having instructions stored thereon that cause data processing apparatus to perform operations comprising:
   receiving input specifying different data format representations for respective different material properties of an object to be manufactured, wherein the different data format representations comprise two or more discretized data format representations having respective different resolutions;
   generating a 3D model of the object within a 3D space using the different data format representations to store values for the different material properties that overlap in the 3D space; and
   storing the 3D model of the object for use in manufacturing the object.

22. The computer storage medium of claim 21, wherein receiving the input specifying different data format representations for respective different material properties comprises receiving selections of predefined properties provided by an interface.

23. The computer storage medium of claim 21, wherein the different data format representations comprise at least one continuous data format representation.

* * * * *